(12) United States Patent
Jørgensen

(10) Patent No.: US 8,469,052 B2
(45) Date of Patent: Jun. 25, 2013

(54) CONTROL VALVE

(75) Inventor: Agnes Jørgensen, Slagelse (DK)

(73) Assignee: Frese A/S, Slagelse (DK)

( * ) Notice: Subject to any disclaimer, the term of this patent is extended or adjusted under 35 U.S.C. 154(b) by 310 days.

(21) Appl. No.: 12/991,142

(22) PCT Filed: May 4, 2009

(86) PCT No.: PCT/DK2009/000102
§ 371 (c)(1),
(2), (4) Date: Nov. 29, 2010

(87) PCT Pub. No.: WO2009/135490
PCT Pub. Date: Nov. 12, 2009

(65) Prior Publication Data
US 2011/0068284 A1    Mar. 24, 2011

(30) Foreign Application Priority Data
May 5, 2008   (DK) ................................. 2008 00634

(51) Int. Cl.
*F16K 31/12*   (2006.01)
(52) U.S. Cl.
USPC . 137/501; 137/495; 137/505.13; 137/505.14; 137/505.18; 137/505.28; 137/505.36
(58) Field of Classification Search
USPC ................... 137/331, 333, 495, 501, 505.13, 137/505.14, 505.18, 505.24, 505.27, 505.28, 137/505.36, 505.47; 251/46, 56
See application file for complete search history.

(56) References Cited

U.S. PATENT DOCUMENTS

| | | | | |
|---|---|---|---|---|
| 5,860,591 A | * | 1/1999 | Gylov et al. | 236/42 |
| 6,062,257 A | * | 5/2000 | Wild et al. | 137/501 |
| 2007/0074769 A1 | * | 4/2007 | Moesby | 137/501 |
| 2008/0245428 A1 | * | 10/2008 | Jorgensen | 137/627.5 |

FOREIGN PATENT DOCUMENTS

| | | |
|---|---|---|
| DE | 4416154 A1 | 11/1995 |
| WO | WO2005/038314 A1 | 4/2005 |
| WO | WO2005/038315 A1 | 4/2005 |
| WO | WO2006/136158 A1 | 12/2006 |

OTHER PUBLICATIONS

International Search Report, (Nov. 4, 2010).
Danish Search Report, (Dec. 10, 2008).

\* cited by examiner

*Primary Examiner* — Craig Schneider
*Assistant Examiner* — Jessica Cahill
(74) *Attorney, Agent, or Firm* — William J. Sapone; Ware Fressola Maguire & Barber LLP

(57) ABSTRACT

A control valve comprises a valve housing (1) having an inlet side (17) and an outlet side (18). The control valve also has a pressure maintaining arrangement for maintaining a constant differential pressure between the inlet and outlet sides, as well as an amount control arrangement for setting the maximum flow through the valve. A pair of cylinder shells located in the flow path have cooperating recesses which provide an uncovered area forming an opening (25). One cylinder shell is rotatable relative to the other cylinder shell by a rotatable handle (13), whereby a larger or smaller opening (25) between the cooperating cylinder shells may be provided. Both cylinder shells are axially displaceable within a seat hole (8), resulting in an increase or a decrease of the opening (25).

11 Claims, 4 Drawing Sheets

CONTROL VALVE

THE PRIOR ART

The invention relates to a control valve having an inlet side and an outlet side in a valve housing, in which a pressure maintaining arrangement is mounted for maintaining a constant differential pressure between the inlet and outlet sides, said assembly comprising a rolling diaphragm and a throttle member which sets itself in a balance between the inlet pressure and the outlet pressure as well as between the inlet pressure on the one hand and the outlet pressure as well as spring force on the other hand, respectively and with an amount control arrangement having an adjustable basic setting and a flow opening reducing arrangement, which may be activated via a spindle connected with an actuator, wherein the amount control is established by mutual rotation of an orifice having cooperating outer and inner slide shell faces, and wherein the reduction of the flow established by means of the actuator as a basic setting takes place by axial movement of the downstream cylinder shell face, said object carrying a sealing area for cooperation with the valve housing for downstream blocking.

Known in the art are control valves which contain a differential flow governor combined with an arrangement for presetting and adjustment of the liquid amount flowing therethrough. In such a control valve, a differential pressure governor is used as a pressure maintaining arrangement for maintaining a constant differential pressure across an inlet side and an outlet side independently of the liquid amount flowing therethrough, as a throttle member sets itself in a balance under the action of the inlet pressure on the one hand and the outlet pressure as well as a spring force on the other hand, so that the pressure difference will always be the scene, irrespective of the other circumstances, such as the flow amount through the governor. The arrangement for presetting and adjustment of the liquid flow amount includes an orifice as an amount control arrangement, which may be adjustable from the outside to a basic setting providing an opening for maximum flow, and, in addition, a flow opening reducing arrangement which may be activated via an outer actuator, may be included.

The description of WO 2006 136158 A discloses a control valve for use in liquid carrying systems with a valve housing having an inlet side and an outlet side, wherein the valve housing is provided with a pressure maintaining arrangement for maintaining a constant differential pressure between the inlet and outlet sides independently of the liquid amount flowing therethrough, as a contained throttle member together with a rolling diaphragm sets itself in a balance under the action of the inlet pressure on the one hand and the outlet pressure as well as a spring force on the other hand.

Further, the valve housing is provided with an amount control arrangement disposed upstream of the pressure maintaining arrangement and including an orifice which may be adjusted to a basic setting providing an opening for maximum flow, and additionally including a flow opening reducing arrangement, which may be activated via an outer actuator, wherein the basic setting of the flow control arrangement is provided by mutual rotation of two concentric rings of the orifice with recesses through approximately 180 degrees, thereby providing an uncovered area in the flow path of the control valve, and wherein the reduction of the uncovered area in the flow path, thus realized by actuator impact as a basic setting, takes place by axial movement of the downstream concentric object, said object carrying a sealing area for cooperation with the valve housing for downstream blocking in a position most axially pressed-in by the actuator.

The drawbacks of this control valve are not related to the function of the valve, but are caused in particular by the high raw material prices, such as of copper, which constitutes a substantial proportion of the brass alloys used as profile rods as a starting material for many inner components in such control valves. Control valves require much machining of many different objects, which are mainly of brass, which per se is very costly and moreover involves losses in the sense that the copper-containing brass material purchased in rod shape for the production has a price per kg which is considerably higher than the sales price per kg of the same brass alloy, which is sold as chips from the object production for renewed processing into rod material.

To this should be added that the rolling diaphragm incorporated in the pressure maintaining arrangement to maintain the constant differential pressure is easily overloaded, since no pressure relief of the inlet pressure takes place on its outer side, when the throttle member is in its pressed-in position. This permanent pressure impact on the diaphragm wears and extends the material, which is weakened thereby.

THE OBJECT OF THE INVENTION

The object of the invention is to remedy these deficiencies and drawbacks, and this is achieved according to the invention by a control valve, wherein the reduction of the uncovered area in the flow direction realized by actuator impact as a basic setting takes place by axial movement of also the object which includes the cooperating upstream cylinder shell face, and wherein the sealing area for cooperation with the valve housing for down-stream blocking is carried at a greater distance from the axis of the cylinder shell faces than the radius of the cooperating downstream cylinder shell face.

This ensures that the material for the cooperating coaxial cylinder shell faces of the orifice is essentially always present within the diameter of the carried sealing area. Since, in terms of size, control valves of this type are effectively compared by having the same effective closing diameter of the carried sealing area, the importance of this is that the objects with the co-operating cylinder shell elements of the orifice may be made of round rod material having a significantly smaller diameter and thereby much less content of material than previously known relevant control valves, in which the cooperating cylinder shell faces of the orifice are present on diameters which are larger than the effective closing diameter.

When a capillary channel is configured such that it is blocked from the pressure from the inlet on the outer side of the rolling diaphragm when the spindle is most pressed-in, the diaphragm will be relieved in its passive position.

When the spindle is provided with a return spring, it will hereby be returned when the pressing-in by the actuator ceases, following which the diaphragm will again operate against external pressure impact.

When the valve housing is made in one piece by casting or forging, an additionally simplified machining is achieved, as machining of associated joining faces on valve housing parts is avoided, just as it is possible to achieve a saving material.

When the pressure maintaining arrangement and the amount control arrangement are mounted in the same opening in the valve housing, a saving of material is likewise achieved.

When the cooperating coaxial cylinder shell faces are given the same axial movement, a control valve having a more unique, reproducible and safe function in response to the impact from the external actuator is achieved.

When the object is configured such that the cooperating downstream cylinder shell face is surrounded fully or partly by the throttle member, a saving of material is likewise achieved.

Finally it is expedient to provide an externally accessible rotatable handle for an object including a rotatable, cooperating coaxial cylinder shell face, whereby the basic setting of the amount control arrangement may readily be adjusted exactly to a desired basic setting after the system in which the control valve of the invention is mounted, has been put to service.

THE DRAWING

A working example of a control valve according to the invention will now be described more fully with reference to the drawing, in which.

DESCRIPTION OF THE WORKING EXAMPLE

Figure 1:
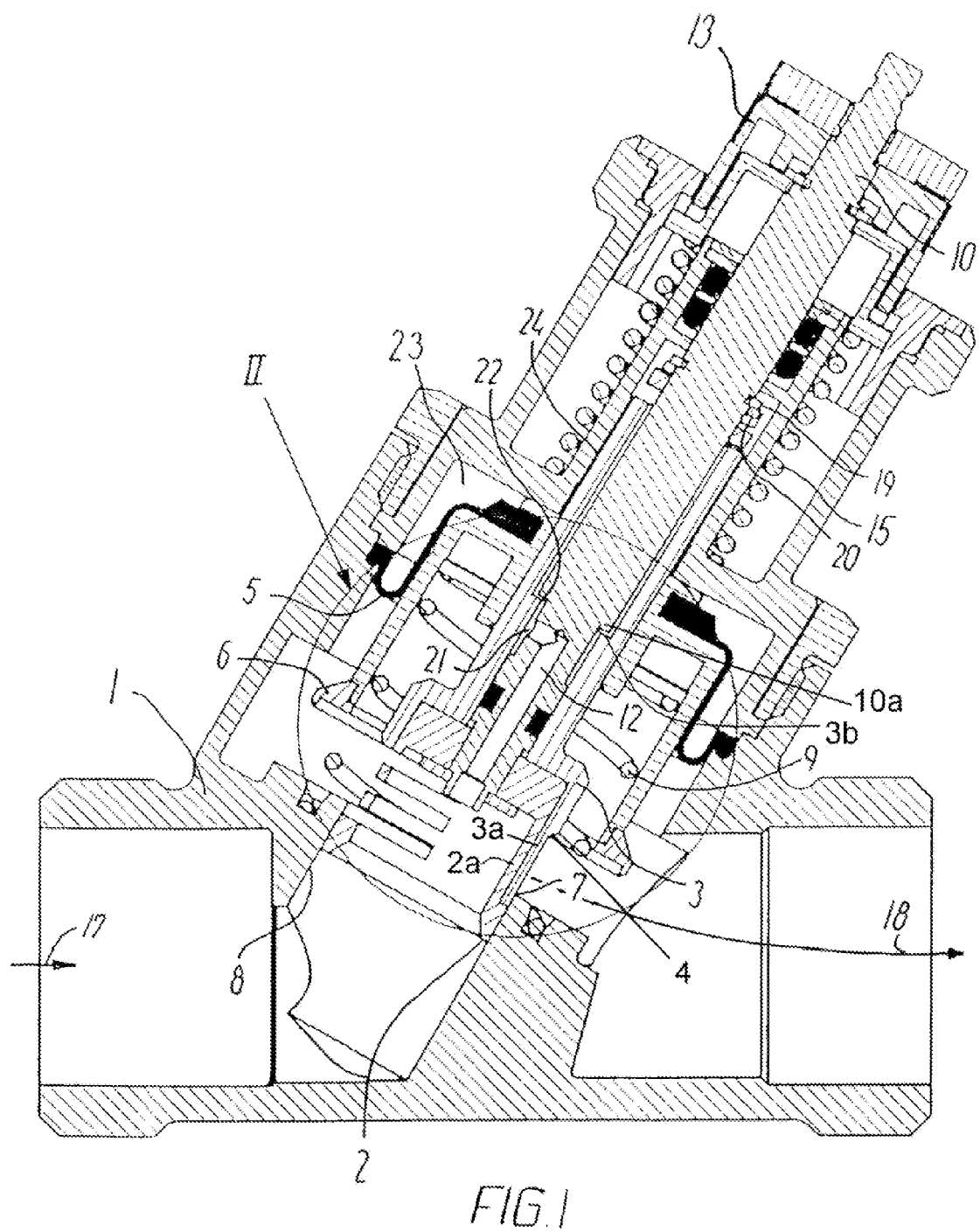
FIG. 1 shows a control valve seen in a vertical section.

In FIG. 1, a control valve according to the invention is shown in a sectional view, consisting of a valve housing 1 having an inlet 17 and an outlet 18. The pressure maintaining mechanism consists of a rolling diaphragm 5 and a throttle member 6 which supports the rolling diaphragm. The pressure at the inlet 17 is transferred to the outer side 23 of the rolling diaphragm 5 through a bore 12 in the spindle 10 and a capillary channel 22 between the spindle and an outer cylinder shell 3. From there, the inlet pressure will propagate along the outer side 24 of an inner cylinder shell 2 to the space 23 and thereby the outer side of the diaphragm 5.

A spring 9 urges the throttle member 6 to its top position in cooperation with the pressure within the closing diameter of the throttle member 6.

In use, a balance is established between the inlet pressure 17 and the outlet pressure 18 plus the spring force from the spring 9. This differential pressure will therefore be constant with a given spring force.

Figure 2:
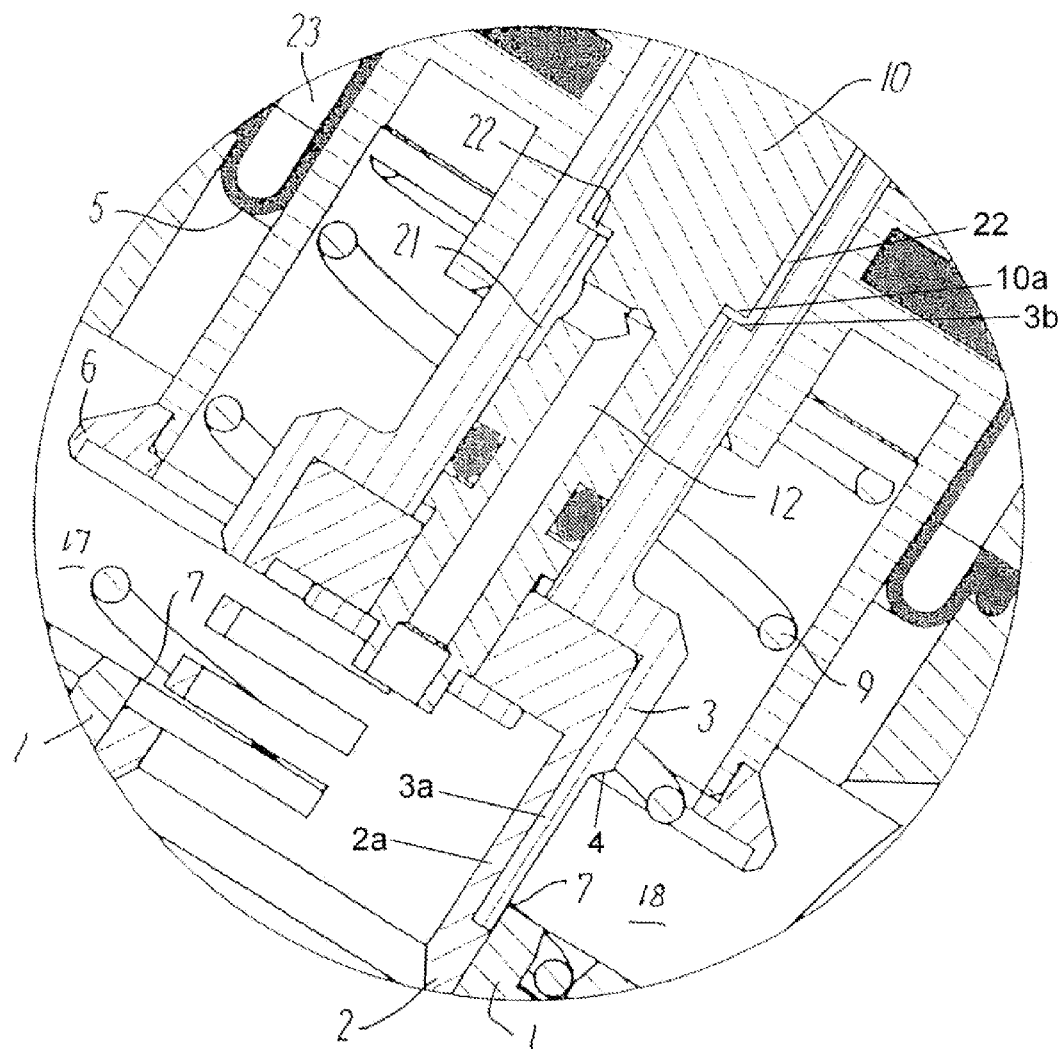
FIG. 2 shows an enlarged view of the valve area designated II in FIG. 1.

FIG. 2 shows the arrangement for adjusting and optionally blocking the flow amount. The outer cylinder shell 3 is provided with a face 3a having an annular recess which extends over approximately half the circumference. Within this and coaxially with it, there is a face 2a provided with the inner cylinder shell 2 having a corresponding annular recess. The inner cylinder shell 2 is connected with a rotatable handle 13 by means of the spindle 10, so that its angular position relative to the outer cylinder shell 3 may be adjusted by means of the rotatable handle 13. Thereby, the overlap in the circumference direction between the cooperating cylinder shell faces 2a and 3a and their annular recesses determines the maximum flow amount through the control valve which may be adjusted manually.

The cylinder shells 2 and 3 are axially stationary relative to each other. However, both are axially displaceable relative to the seat hole 8 and thereby also the edge 7 of the seat hole against the action of a compression spring 15.

The axial overlap between the cooperating cylinder shells 2 and 3 and the edge 7 of the seat hole may be changed by axial displacement, whereby the amount flowing through the control valve may be set or adjusted within the limits of the preset maximum value.

In the one outer position, blocking of the flow may be established in that the cylinder shell 3 after the recess is provided with a sealing surface 4 having a radius which is larger than the radius of the seat hole 8, and is caused to cooperate and engage with the edge 7 of the seat hole 8 by the axial displacement.

Figure 3:
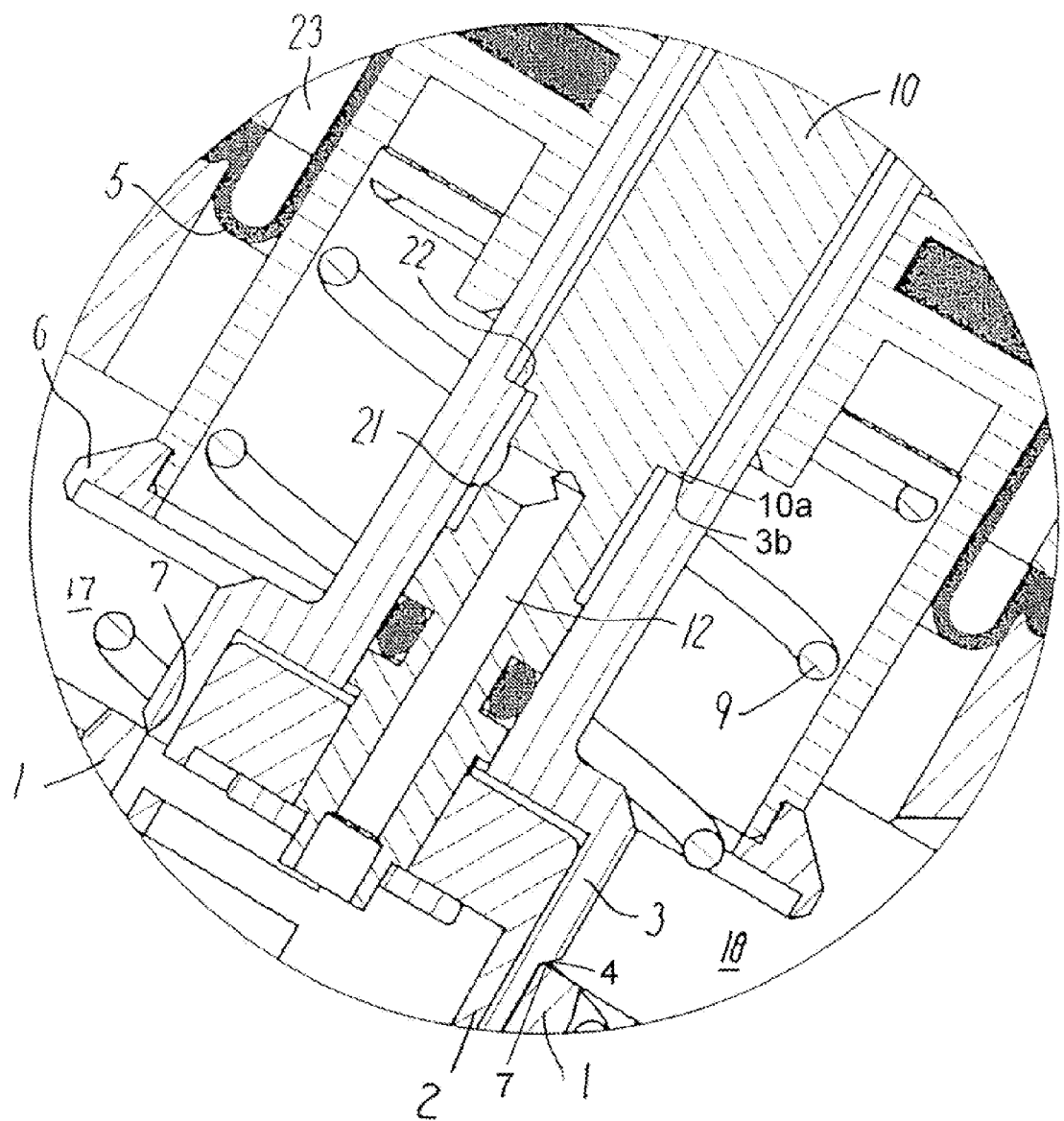
FIG. 3 shows the same area, but with the spindle in a pressed-in position.

It is shown in an enlarged view in FIGS. 2 and 3 how the inlet pressure on the outer side of the rolling diaphragm 5 may be cut off, when a portion 10a of the spindle 10 and a portion 3b of the cylinder shell 3 are set in an open position, as shown in FIG. 2, and in the most pressed-in position, which is shown in FIG. 3, by means of an actuator (not shown).

It appears from FIG. 2 that the pressure may spread via the channel 12 in the spindle 10 and a capillary channel 21 provided in a recess 22 and a connection 24, which extends externally in the cylinder shell element 3 and into the space 23 above the rolling diaphragm 5.

When, as shown in FIG. 3, the spindle 10 is pressed-in completely, the sealing surface 4 of the outer cylinder shell 3 is caused to contact the edge 7 of the seat hole 8, whereby the flow is interrupted, just as the capillary connection 21 is interrupted at the recess 22 after the portion 10a of the spindle 10 has moved a further small distance relative to the portion 3b of the cylinder shell 3. This small spindle movement of about 0.5 mm ensures that the blocking takes place after the closure, and then a small return spring 20, see FIG. 1 which is disposed between a stop 19 and the spindle 10 and the upper portion of the cylinder shell 3, will return the spindle 10 by its spring force.

This is gentle to the rolling diaphragm 5, as the inlet pressure is relieved on its outer side, when this pressure impact is not needed for the function of the diaphragm. This ensures that the flexible diaphragm is not subjected to undue pressure loading.

FIGS. 4, 5, 6 and 7 illustrate the adjustment and control principle.

Figure 4:
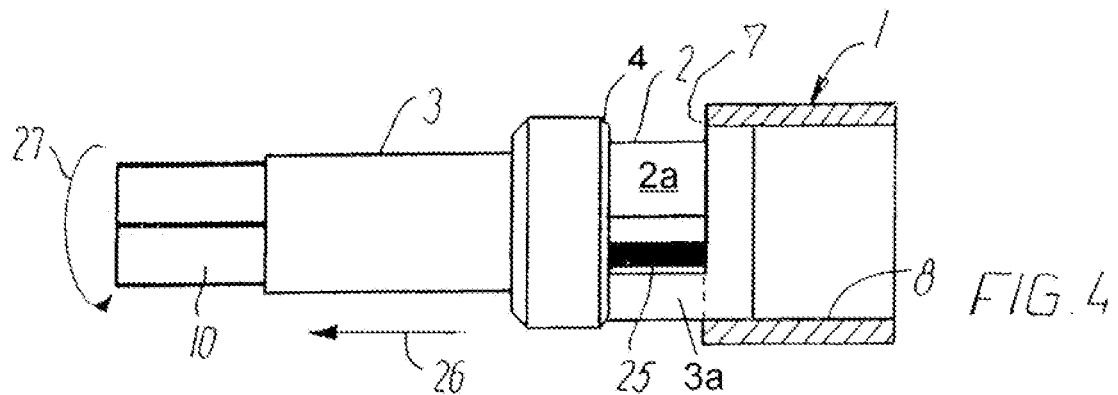
FIGS. 4-7 show a partially sectional view of four different basic settings.

FIG. 4 shows a relatively small angular rotation 27 between the cylinder shell faces 2a and 3a of the cylinder shells 2 and 3, axially displaced 26 to their greatest distance from the edge 7 of the seat hole, where the generated flow area is indicated by a black field 25.

Figure 5:
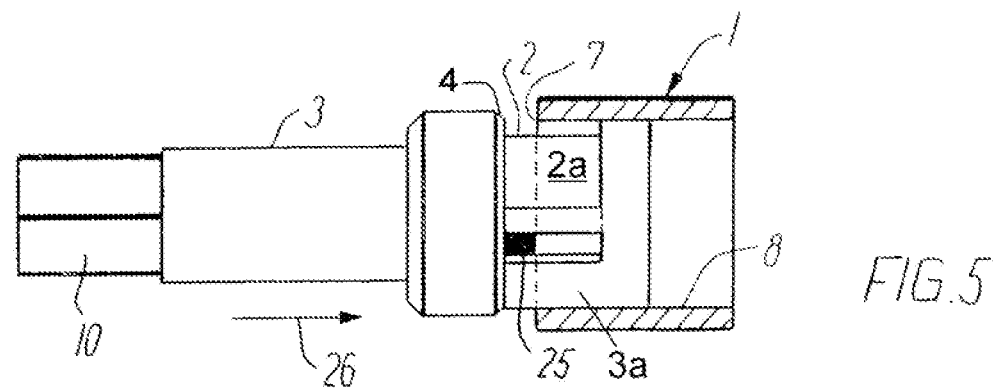

FIG. 5 shows the same angular rotation 27, but with the cylinder shell faces 2a and 3a displaced in an axial direction 26 relative to the edge 7 of the seat hole, and how the area generated in this position is likewise indicated by the smaller, black field 25.

Figure 6:
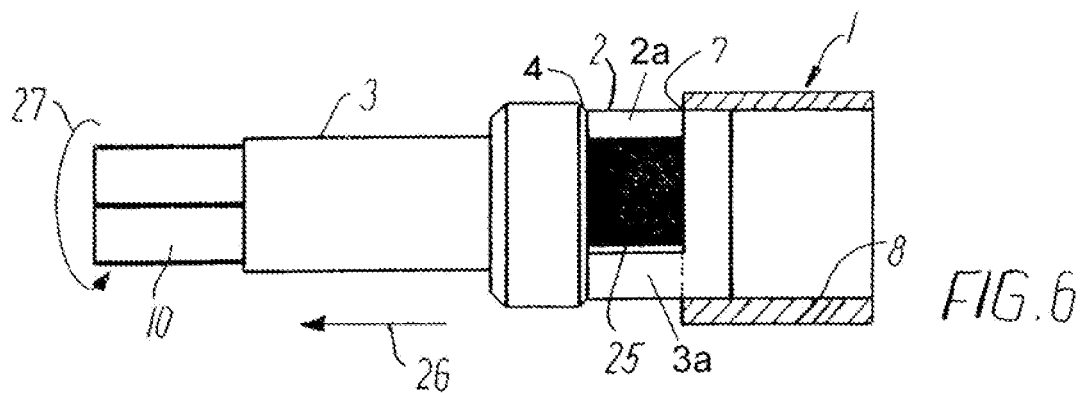

FIG. 6 shows a greater angular rotation 27 between the cylinder shell 2 and 3 by axial displacement 26 to their greatest distance from the edge 7 of the seat hole, where the generated maximum flow area is indicated by a black field 25.

Figure 7:
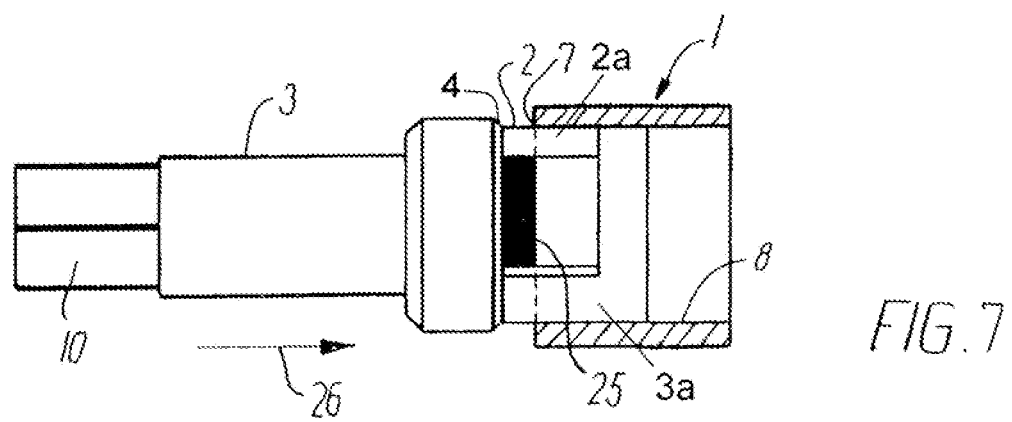

FIG. 7 shows the same greater angular rotation, but with the cylinder shell 2 and 3 displaced in an axial direction 26 relative to the edge 7 of the seat hole, and the flow area generated in this position is likewise indicated by a black field 25.

The invention claimed is:

1. A control valve comprising:
a valve housing having an inlet side (17) and an outlet side (18),
an amount control arrangement having an adjustable basic setting and a flow opening reducing arrangement, a pressure maintaining arrangement mounted in the valve housing for maintaining a constant differential pressure between an inlet side and an outlet side of said amount control arrangement, said pressure maintaining arrangement including a rolling diaphragm (5) and a throttle member (6) which sets itself in a balance between an inlet pressure on the one hand and an outlet pressure as well as a spring force on the other hand, respectively, the flow opening reducing arrangement activated via a spindle (10) connectable to an actuator, wherein amount control is established by relative rotation between of an inner cylinder shell (2) relative to an outer cylinder shell (3), the pair of cylinder shells disposed adjacent to each other, and having corresponding faces (2a, 3a) disposed adjacent to each other, the faces being rotatably movable relative to each other, each face having a cooperating recess with the cooperating recesses movable into and out of alignment, the cooperating recesses together forming an orifice defining an unblocked area for flow to pass therethrough, rotatably moving the recesses relative to each other adjusting a size of the unblocked area for permitting control of an amount of flow therethrough, and wherein a reduction of flow is established by axial displacement of the pair of cylinder shells (2, 3) within a seat hole (8), a reduction of the unblocked area taking place as the cooperating recesses of the pair of cylinder shells move into and out of the seat hole, thereby covering or uncovering the orifice formed by the cooperating recesses for reducing a flow therethrough.

2. The control valve according to claim 1, further comprising a sealing surface (4) extending from the outer cylinder shell, the seat hole (8) having an edge (7), wherein axial displacement of the pair of cylinder shells engages the sealing surface (4) with the edge (7) for blocking flow through the orifice.

3. The control valve according to claim 1, wherein the valve housing (1) is in one piece.

4. The control valve according to claim 1 wherein the pressure maintaining arrangement and the amount control arrangement are mounted within a common opening in the valve housing (1).

5. The control valve according to claim 1, characterized in that
the cooperating coaxial cylinder shell faces (2, 3) are simultaneously given the same axial movement.

6. The control valve according to claim 1, wherein the throttle member (6) at least partly surrounds the outer cylinder shell (3).

7. The control valve according to claim 1, further comprising a rotatable handle (13) connected with the inner cylinder shell (2) for rotating the angular position thereof relative to the outer cylindrical shell (3).

8. The control valve according to claim 1, further comprising a capillary channel (21) passing through the spindle (10) and through a portion of the outer cylinder shell (3) disposed adjacent the spindle (10), wherein a pressure is transferred from an inner side of the rolling diaphragm to an outer side (23) of the rolling diaphragm (5) via the capillary channel.

9. The control valve according to claim 8, wherein the spindle (10) has a return spring (20) mounted between a fixed stop (19) on the spindle and the outer cylinder element (3).

10. The control valve according to claim 8, further comprising a recess (22) provided internally on the portion of the outer cylinder shell (3) adjacent the spindle (10), the spindle having a portion (10a) projecting into the recess (22), the spindle being axially movable within the recess (22) such that the projecting portion is engageable with a surface (3b) of the outer cylinder shell (3), for closing said capillary channel.

11. The control valve according to claim 10, wherein the spindle (10) is provided with a return spring (20) mounted between a fixed stop (19) on the spindle and the outer cylinder shell (3).

* * * * *